United States Patent
Liu

(10) Patent No.: US 10,312,829 B2
(45) Date of Patent: Jun. 4, 2019

(54) FRICTIONAL ELECTRICITY-GENERATING DEVICE AND A METHOD FOR MANUFACTURING THE SAME, ELECTRONIC APPARATUS AND WEARABLE APPARATUS

(71) Applicant: BOE TECHNOLOGY GROUP CO., LTD., Beijing (CN)

(72) Inventor: Zhen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 312 days.

(21) Appl. No.: 15/096,825

(22) Filed: Apr. 12, 2016

(65) Prior Publication Data
US 2016/0344307 A1 Nov. 24, 2016

(30) Foreign Application Priority Data

May 19, 2015 (CN) .......................... 2015 1 0256025

(51) Int. Cl.
H02N 1/04 (2006.01)
H02N 1/00 (2006.01)

(52) U.S. Cl.
CPC ..................... *H02N 1/04* (2013.01)

(58) Field of Classification Search
CPC .. H02N 1/04; H02N 1/10; H02N 2/18; H05K 2201/026
See application file for complete search history.

(56) References Cited

U.S. PATENT DOCUMENTS

| 9,178,446 | B2* | 11/2015 | Wang | H02N 1/04 |
| 9,762,151 | B2* | 9/2017 | Zhang | H02N 11/002 |
| 9,790,928 | B2* | 10/2017 | Wang | F03G 5/06 |
| 9,825,557 | B2* | 11/2017 | Wang | H02N 1/04 |
| 9,876,443 | B2* | 1/2018 | Bae | H02N 1/04 |
| 9,887,644 | B2* | 2/2018 | Kim | H02N 1/04 |
| 9,906,170 | B2* | 2/2018 | Choi | H02N 1/04 |
| 2011/0148248 | A1* | 6/2011 | Landa | H01J 45/00 310/306 |

(Continued)

FOREIGN PATENT DOCUMENTS

| CN | 202948675 U | 5/2013 |
| CN | 203537270 U | 4/2014 |

(Continued)

OTHER PUBLICATIONS

Office Action in Chinese Patent Application No. 201510256025.2, dated Jul. 6, 2016.

*Primary Examiner* — Edgardo San Martin
(74) *Attorney, Agent, or Firm* — Brooks Kushman P.C.

(57) ABSTRACT

The present disclosure provides a frictional electricity-generating device and a method for manufacturing the same, an electronic apparatus and a wearable apparatus. The frictional electricity-generating device comprises at least one friction unit, which comprises a first conductive electrode, an organic friction unit and a second conductive electrode. The first conductive electrode and the organic friction unit can generate electricity by contact friction, the first conductive electrode comprises a friction layer with a concave-convex friction surface, and the friction layer comprises a base layer and a metal nanowire.

19 Claims, 2 Drawing Sheets

(56) References Cited

U.S. PATENT DOCUMENTS

| | | | | |
|---|---|---|---|---|
| 2016/0028327 A1* | 1/2016 | Aliane | .................. | B05D 3/065 |
| | | | | 310/300 |
| 2016/0156282 A1* | 6/2016 | Kim | ........................ | H02N 1/04 |
| | | | | 607/61 |
| 2016/0315561 A1* | 10/2016 | Shin | ........................ | H02N 1/04 |
| 2017/0331397 A1* | 11/2017 | Kim | ........................ | H02N 1/04 |

FOREIGN PATENT DOCUMENTS

| | | | | |
|---|---|---|---|---|
| CN | 104348379 A | 2/2015 | | |
| KR | 10-2015-0025184 A | 3/2015 | | |
| WO | WO 2013170651 A1 * | 11/2013 | ............... | H02N 1/04 |
| WO | WO 2014005434 A1 * | 1/2014 | ............... | H02N 1/04 |

\* cited by examiner

FRICTIONAL ELECTRICITY-GENERATING DEVICE AND A METHOD FOR MANUFACTURING THE SAME, ELECTRONIC APPARATUS AND WEARABLE APPARATUS

CROSS-REFERENCE TO RELATED APPLICATION

The present application claims priority to the Chinese patent Application No. 201510256025.2 filed in China on May 19, 2015, the entire contents of which are incorporated by reference.

FIELD OF THE INVENTION

The present disclosure relates to the field of frictional electricity generation technologies, and in particular, to a frictional electricity-generating device and a method for manufacturing the same, an electronic apparatus and a wearable apparatus.

BACKGROUND

The existing frictional electricity-generating devices usually generate electricity by rubbing two friction layers of different materials. When the materials of the two friction layers are different, the electron restriction abilities will be different, thus electron transfer will occur during mutual friction, and opposite charges with the same amount will be generated on the two friction layers, thereby a voltage will be generated. In the prior art, in order to improve friction efficiency, the friction surfaces of the friction layers will usually be treated to increase the surface roughness. However, the process of treating the friction surface is so long, and the techniques for treating the friction surface are relatively complex.

SUMMARY

Therefore, the present disclosure provides a frictional electricity-generating device and a method for manufacturing the same, an electronic apparatus and a wearable apparatus, thereby the friction efficiency of the frictional electricity-generating device may be improved, and the manufacturing technique will be simple.

In order to solve the above technical problem, the disclosure provides a frictional electricity-generating device, which includes at least one friction unit, wherein the friction unit includes: a first conductive electrode, an organic friction unit and a second conductive electrode, wherein the first conductive electrode and the organic friction unit can generate electricity by contact friction, the first conductive electrode includes a friction layer with a concave-convex friction surface, and the friction layer includes a base layer and a metal nanowire.

Optionally, the first conductive electrode includes a base layer and a metal nanowire formed on the surface of the base layer.

Optionally, the first conductive electrode includes at least two base layers and a metal nanowire formed between the base layers.

Optionally, the metal nanowire is a silver nanowire.

Optionally, the organic friction unit and the second conductive electrode are set in a form of lamination.

Optionally, the second conductive electrode and the organic friction unit can generate electricity by contact friction, and the organic friction unit includes: a first organic friction layer and a second organic friction layer, wherein, the first organic friction layer and the first conductive electrode are set oppositely and can generate electricity by contact friction, and the second organic friction layer and the second conductive electrode are set oppositely and can generate electricity by contact friction.

Optionally, the second conductive electrode includes a friction layer with a concave-convex friction surface, and the friction layer includes a base layer and a metal nanowire.

Optionally, the organic friction unit includes a friction layer with a concave-convex friction surface, and the friction layer of the organic friction unit includes at least two base layers and a metal nanowire formed between the base layers.

The disclosure further provides an electronic apparatus, which includes an electricity-consuming unit and the above frictional electricity-generating device, wherein the frictional electricity-generating device is connected with the electricity-consuming unit, for supplying electrical energy to the electricity-consuming unit.

The disclosure further provides a wearable apparatus, which includes a display unit and the above frictional electricity-generating device, wherein the frictional electricity-generating device is connected with the display unit, for supplying electrical energy to the display unit.

Optionally, the wearable apparatus further includes:
a weighting layer, which is fixedly connected with the organic friction unit; and
a driving unit, which is connected with the weighting layer, for driving the weighting layer to move back and forth so as to bring the organic friction unit to move relative to the conductive electrode.

Optionally, the driving unit is an automatic gyroscope.

The disclosure further provides a method for manufacturing a frictional electricity-generating device, which is used for manufacturing the above frictional electricity-generating device, the method includes a step of forming a friction unit, wherein the friction unit includes: a first conductive electrode, an organic friction unit and a second conductive electrode, the first conductive electrode and the organic friction unit can generate electricity by contact friction, the first conductive electrode includes a friction layer with a concave-convex friction surface, and the friction layer includes a base layer and a metal nanowire.

The above technical solutions of the disclosure have the following beneficial effects:

The conductive electrode in the friction unit includes a friction layer with a concave-convex friction surface, the friction layer includes a base layer and a metal nanowire, so that the degree of surface roughness of the conductive electrode may be increased, thereby the friction efficiency of the frictional electricity-generating device may be improved.

DETAILED DESCRIPTION

Figure 1:
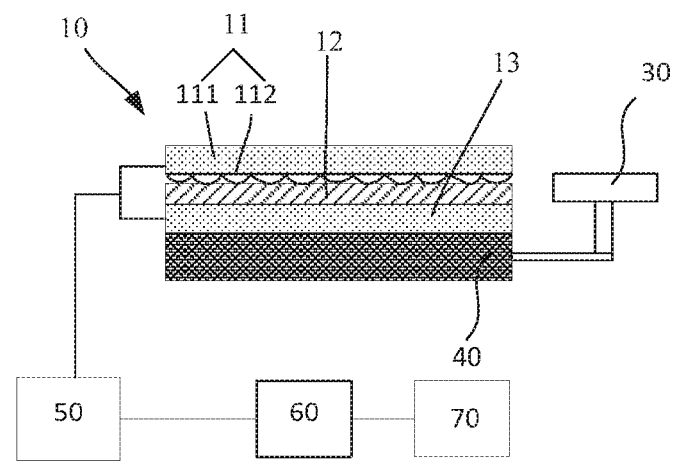
FIG. 1 is a structural representation of a frictional electricity-generating device according to Embodiment 1 of the disclosure.

In order to improve friction efficiency, the embodiments of the disclosure provide a frictional electricity-generating device, which includes at least one friction unit, wherein the friction unit includes: a first conductive electrode, an organic friction unit and a second conductive electrode, wherein the first conductive electrode and the organic friction unit can generate electricity by contact friction, the first conductive electrode includes a friction layer with a concave-convex friction surface, and the friction layer includes a base layer and a metal nanowire.

In one embodiment of the disclosure, the first conductive electrode of the friction unit includes a friction layer with a concave-convex friction surface, so that the degree of surface roughness of the first conductive electrode may be increased, thereby the friction efficiency of the frictional electricity-generating device may be improved.

In one embodiment of the disclosure, the first conductive electrode with a concave-convex friction surface includes a base layer and a metal nanowire formed on the surface of the base layer.

In the frictional electricity-generating device according to this embodiment, the relative friction surface area is increased, the friction efficiency is improved, and it has the advantages of simple manufacturing technique and low cost.

In another embodiment of the disclosure, the first conductive electrode with a concave-convex friction surface includes at least two base layers and a metal nanowire formed between the base layers.

In the frictional electricity-generating device according to this embodiment, a metal nanowire is set between the base layers. The surface of the base layer will also exhibit a concave-convex structure, and the friction surface area will be increased. Further, the electric contact between the metal nanowire and the metal base layer may also be improved, and the conductivity may be improved. Thus the electricity-generating efficiency will be improved.

In the embodiments of the disclosure, the metal nanowire may be a metal wire of gold, silver, platinum, palladium, aluminum, nickel, copper, titanium, chromium, tin, iron, manganese, aluminum, tungsten or vanadium, etc. Optionally, the metal nanowire is a silver nanowire, which has the features of rough surface and high electric conductivity.

In order to provide more electric quantity, the frictional electricity-generating device according to the embodiments of the disclosure may also include a plurality of friction units that are connected in series.

The frictional electricity-generating device may have various structures.

In one embodiment of the disclosure, the organic friction unit and the second conductive electrode are set in a form of lamination.

In this embodiment, the first conductive electrode includes a friction layer with a concave-convex friction surface, and the friction layer includes a base layer and a metal nanowire.

The organic friction unit may employ one or more of polyethylene terephthalate film, polytetrafluoroethylene film, polyimide film, aniline formaldehyde resin film, polyformaldehyde film, ethylcellulose film, polyamide film, melamine formaldehyde resin film, polydiethylene glycol succinate film, cellulose film, cellulose acetate film, polyethylene glycol adipate film, polydiallyl phthalate film, fiber regeneration sponge film, polyurethane elastomer film, styrene-propylene copolymer film, styrene-butadiene copolymer film, artificial fiber film, polyacrylate film, polyvinyl alcohol film, polyisobutene film, polyvinyl butyral film, formaldehyde-phenol condensation polymer film, polychloroprene film, butadiene-propylene copolymer film, natural rubber film, polyacrylonitrile film, acrylonitrile-chloroethylene copolymer film and polyethylene propylene carbonate.

In another embodiment of the disclosure, the organic friction unit includes: a first organic friction layer and a second organic friction layer, wherein, the first organic friction layer and the first conductive electrode are set oppositely and can generate electricity by contact friction, and the second organic friction layer and the second conductive electrode are set oppositely and can generate electricity by contact friction. That is, the second conductive electrode and the organic friction unit can also generate electricity by contact friction.

In this embodiment, the second conductive electrode may also include a friction layer with a concave-convex friction surface, and the friction layer includes a base layer and a metal nanowire.

The first conductive electrode and the second conductive electrode are required to generate different charges, for example, charges with different electric quantities or charges with different electrical polarities, so that a voltage may be generated between the first conductive electrode and the second conductive electrode. In order to generate different charges on the first conductive electrode and the second conductive electrode, the first organic friction layer and the second organic friction layer may employ different high molecular polymer insulating materials.

The first organic friction layer and the second organic friction layer may employ any two different high molecular polymer insulating materials selecting from the group consisting of polyethylene terephthalate film, polytetrafluoroethylene film, polyimide film, aniline formaldehyde resin film, polyformaldehyde film, ethylcellulose film, polyamide film, melamine formaldehyde resin film, polydiethylene glycol succinate film, cellulose film, cellulose acetate film, polyethylene glycol adipate film, polydiallyl phthalate film, fiber regeneration sponge film, polyurethane elastomer film, styrene-propylene copolymer film, styrene-butadiene copolymer film, artificial fiber film, polyacrylate film, polyvinyl alcohol film, polyisobutene film, polyvinyl butyral film, formaldehyde-phenol condensation polymer film, polychloroprene film, butadiene-propylene copolymer film, natural rubber film, polyacrylonitrile film, acrylonitrile-chloroethylene copolymer film and polyethylene propylene carbonate.

In the above two embodiments, in order to improve friction efficiency, preferably, the frictional electricity-generating device may also include:

a weighting layer, which is fixedly connected with the organic friction unit;

a driving unit, which is connected with the weighting layer, for driving the weighting layer to move back and forth so as to bring the organic friction unit to move relative to the conductive electrode.

However, in other embodiments of the disclosure, the weighting layer may also be fixedly connected with the first conductive electrode so as to bring the first conductive electrode to move. In one embodiment in which the second conductive electrode can generate electricity by contact friction with an organic friction unit, a weighting layer may also be fixedly connected with the second conductive electrode so as to bring the second conductive electrode to move.

In each of the above embodiments, the organic friction unit may also include a friction layer with a concave-convex friction surface, wherein the friction layer includes at least two base layers and a metal nanowire formed between the base layers, so that the friction force between the organic friction unit and the conductive electrode may be further increased.

Specific implementation of the disclosure will be further described in detail below in conjunction with the drawings and embodiments. The embodiments below are only used for illustrating the disclosure, rather than limiting the scope of the disclosure.

Referring to FIG. 1, it is a structural representation of a frictional electricity-generating device according to Embodiment 1 of the disclosure. The frictional electricity-generating device of this embodiment includes a friction unit 10, which includes: a first conductive electrode 11, an organic friction unit 12 and a second conductive electrode 13, wherein the second conductive electrode 13 and the organic friction unit 12 are set in a form of lamination, the first conductive electrode 11 and the organic friction unit 12 can generate electricity by contact friction, and a voltage can be generated between the first conductive electrode 11 and the second conductive electrode 13. The first conductive electrode 11 includes a friction layer with a concave-convex friction surface, and the friction layer includes a metal base layer 111 and a metal nanowire 112 formed on the surface of the metal base layer 111.

In the embodiments of the disclosure, a metal nanowire is set in the first conductive electrode of the organic fraction unit, so that the degree of surface roughness of the first conductive electrode may be increased, thereby the friction efficiency of the frictional electricity-generating device may be improved. Moreover, the technique for forming a metal nanowire on the surface of the metal base layer is relatively simple, and the production cost may be reduced.

Referring to FIG. 1, the frictional electricity-generating device according to this embodiment of the disclosure further includes a driving unit 30, which is fixedly connected with the second conductive electrode 13 via a weighting layer 40, and the driving unit 30 is connected with the weighting layer 40, for driving the weighting layer 40 to move back and forth, so that the organic friction unit 12 may rub the first conductive electrode 11. The weighting layer 40 functions to increase the friction force. Optionally, the weighting layer 40 is made of a metal material.

In order to store the electrical energy generated by friction, the frictional electricity-generating device according to the embodiment of the disclosure may also include: a conducting unit 50, a circuit unit 60 and an energy storage unit 70, wherein, the conducting unit 50 is connected with the friction unit 10, for exporting the electric current generated by the friction unit 10; the circuit unit 60 is connected with the conducting unit 50 and the energy storage unit 70, for treating the electric current exported by the conducting unit 50 and storing it in the energy storage unit 70.

After the electrical energy is stored in the energy storage unit 70, it may be supplied to an electricity-consuming apparatus for use.

Figure 2:
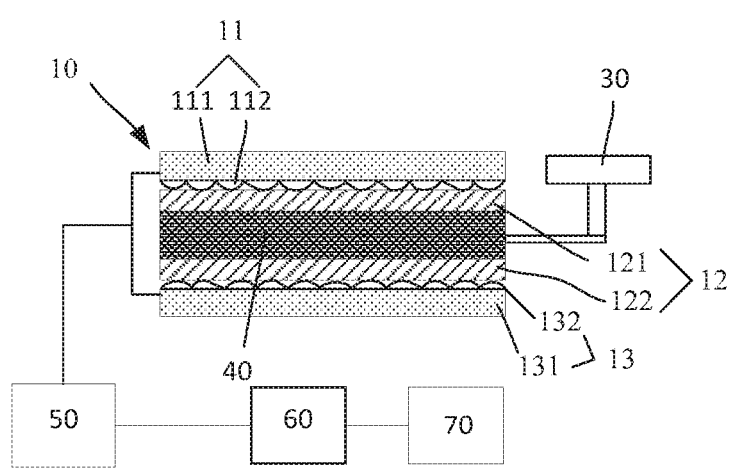
FIG. 2 is a structural representation of a frictional electricity-generating device according to Embodiment 2 of the disclosure.

Referring to FIG. 2, it is a structural representation of a frictional electricity-generating device according to Embodiment 2 of the disclosure. The frictional electricity-generating device of this embodiment includes a friction unit 10, which includes: a first conductive electrode 11, an organic friction unit 12 and a second conductive electrode 13, wherein, the organic friction unit 12 includes a first organic friction layer 121 and a second organic friction layer 122, the first organic friction layer 121 and the first conductive electrode 11 are set oppositely and can generate electricity by contact friction, and the second organic friction layer 122 and the second conductive electrode 13 are set oppositely and can generate electricity by contact friction. A voltage can be generated between the first conductive electrode 11 and the second conductive electrode 13.

The first conductive electrode 11 includes a friction layer with a concave-convex friction surface, and the friction layer of the first conductive electrode 11 includes a metal base layer 111 and a metal nanowire 112 formed on the surface of the metal base layer 111. The second conductive electrode 13 includes a friction layer with a concave-convex friction surface, and the friction layer of the second conductive electrode 13 includes a metal base layer 131 a metal nanowire 132 formed on the surface of the metal base layer 131.

The first organic friction layer 121 and second organic friction layer 122 are made of different high molecular polymer insulating materials, so that the first conductive electrode 11 and the second conductive electrode 13 generate different charges, for example, charges with different electric quantities or charges with different electrical polarities.

In the embodiments of the disclosure, the first conductive electrode and the second conductive electrode are both set with a metal nanowire, so that the degree of surface roughness of the first conductive electrode and the second conductive electrode, thereby the friction efficiency of the frictional electricity-generating device may be improved. Moreover, the technique for forming a metal nanowire on the surface of the metal base layer is relatively simple, and the production cost may be reduced.

Referring to FIG. 2, the frictional electricity-generating device according to the embodiment of the disclosure further includes a driving unit 30, which is fixedly connected with the first organic friction layer 121 and the second organic friction layer 122 respectively via a weighting layer 40, and the driving unit 30 is connected with the weighting layer 40, for driving the weighting layer 40 to move back and forth so as to bring the first organic friction layer 121 and the second organic friction layer 122 to rub the conductive electrodes which are oppositely set respectively, thereby generating a voltage. The weighting layer 40 functions to increase the friction force. Optionally, the weighting layer 40 is made of a metal material.

In the embodiment of the disclosure, the first conductive electrode 11, the first organic friction layer 121 and the weighting layer 40 may be equivalent to a sub-friction unit, and the second conductive electrode 13, the second organic friction layer 122 and the weighting layer 40 may be equivalent to another sub-friction unit. The two sub-friction units are connected in series to form the friction unit 10 of this embodiment.

Figure 3:
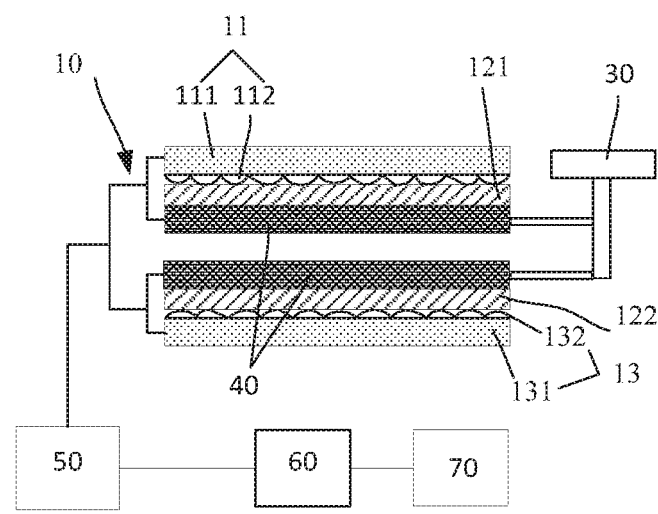
FIG. 3 is a structural representation of a frictional electricity-generating device according to Embodiment 3 of the disclosure.

However, in other embodiments of the disclosure, referring to FIG. 3, the frictional electricity-generating device may also include two weighting layers 40, which are fixedly connected with the first organic friction layer 121 and the second organic friction layer 122 respectively, and the driving unit 30 is connected with the two weighting layers 40, for driving the two weighting layers 40 to move back and forth so as to bring the corresponding organic friction layer to move back and forth relative to the conductive electrode.

In the embodiments of the disclosure, the first conductive electrode 11, the first organic friction layer 121 and one of the weighting layers 40 may be equivalent to a sub-friction unit, and the second conductive electrode 13, the second organic friction layer 122 and the other weighting layer 40 may be equivalent to another sub-friction unit. The two sub-friction units are connected in parallel to form the friction unit 10 of this embodiment.

Referring to FIG. 2, in order to store the electric energy generated by friction, the frictional electricity-generating device according to the embodiment of the disclosure may also include: a conducting unit 50, a circuit unit 60 and an energy storage unit 70, wherein, the conducting unit 50 is connected with the friction unit 10, for exporting the electric current generated by the friction unit 10; and the circuit unit 60 is connected with the conducting unit 50 and the energy storage unit 70, for treating the electric current exported by the conducting unit 50 and storing it in the energy storage unit 70.

After the electrical energy is stored in the energy storage unit 70, it may be supplied to an electricity-consuming apparatus for use.

One embodiment of the disclosure further provides an electronic apparatus, which includes an electricity-consuming unit and a frictional electricity-generating device, wherein the frictional electricity-generating device is the frictional electricity-generating device according to any one of the above embodiments. The frictional electricity-generating device is connected with the electricity-consuming unit, for supplying electrical energy to the electricity-consuming unit. The electronic apparatus includes, but is not limited to, mobile terminals such as mobile phone, flat panel computer and watch, etc. Of course, it may also be other types of electronic apparatuses.

One embodiment of the disclosure further provides a wearable apparatus, which includes a display unit and a frictional electricity-generating device, wherein the frictional electricity-generating device is the frictional electricity-generating device according to any one of the above embodiments. The frictional electricity-generating device is connected with the display unit, for supplying electrical energy to the display unit.

The wearable apparatus may be a watch, an intelligent bracelet, spectacles or a helmet, etc.

The driving unit in the frictional electricity-generating unit may be an automatic gyroscope. When a user wears the watch, a power supply may be provided to the automatic gyroscope during walking, swinging of the body and touching with the hand, etc. Therefore, power may be supplied to the wearable apparatus unintermittently during the moving of the user, and the service time of the wearable apparatus may be prolonged.

One embodiment of the disclosure further provides a method for manufacturing a frictional electricity-generating device, which includes a step of forming a friction unit, wherein the friction unit includes: a first conductive electrode, an organic friction unit and a second conductive electrode, wherein the first conductive electrode and the organic friction unit can generate electricity by contact friction, the first conductive electrode includes a friction layer with a concave-convex friction surface, and the friction layer includes a base layer and a metal nanowire.

In one embodiment, the step of forming the first conductive electrode includes:
 forming a base layer; and
 forming a metal nanowire on the surface of the base layer.

In another embodiment, the step of forming the first conductive electrode includes:
 forming a base layer;
 forming a metal nanowire on the surface of the base layer; and
 further forming another base layer on the metal nanowire.

The above descriptions only show some optional embodiments of the disclosure. It should be pointed out that, for one of ordinary skills in the art, various improvements and modifications may also be made without departing from the principles of the disclosure, and all these improvements and modifications should be regarded as falling into the protection scope of the disclosure.

What is claimed is:

1. A frictional electricity-generating device, wherein, the frictional electricity-generating device comprises at least one friction unit, and the friction unit comprises a first conductive electrode, a second conductive electrode, and an organic friction unit disposed between the first conductive electrode and the second conductive electrode,
 and wherein the first conductive electrode and the organic friction unit can generate electricity by sliding friction between the first conductive electrode and the organic friction unit which are in contact with each other, the first conductive electrode comprises a friction layer with a concave-convex friction surface, and the friction layer comprises a base layer and a metal nanowire.

2. The frictional electricity-generating device according to claim 1, wherein, the metal nanowire is a silver nanowire.

3. The frictional electricity-generating device according to claim 1, wherein, the organic friction unit and the second conductive electrode are set in a form of lamination.

4. The frictional electricity-generating device according to claim 1, wherein, the second conductive electrode and the organic friction unit can generate electricity by sliding friction, and the organic friction unit comprises: a first organic friction layer and a second organic friction layer, wherein, the first organic friction layer and the first conductive electrode are set oppositely and can generate electricity by sliding friction, and the second organic friction layer and the second conductive electrode are set oppositely and can generate electricity by sliding friction.

5. The frictional electricity-generating device according to claim 4, wherein, the second conductive electrode comprises a friction layer with a concave-convex friction surface, and the friction layer of the second conductive electrode comprises a base layer and a metal nanowire.

6. The frictional electricity-generating device according to claim 1, wherein, the frictional electricity-generating device further comprises:
 a weighting layer, which is fixedly connected with the organic friction unit; and
 a driving unit, which is connected with the weighting layer, for driving the weighting layer to move back and forth so as to bring the organic friction unit to move relative the conductive electrode.

7. The frictional electricity-generating device according to claim 1, wherein, the driving unit is an automatic gyroscope.

8. An electronic apparatus, comprising an electricity-consuming unit and the frictional electricity-generating device according to claim 1, wherein, the frictional electricity-generating device is connected with the electricity-consuming unit, for supplying electrical energy to the electricity-consuming unit.

9. The electronic apparatus according to claim 8, wherein, the first conductive electrode comprises a base layer and a metal nanowire formed on the surface of the base layer.

10. The electronic apparatus according to claim 8, wherein, the second conductive electrode and the organic friction unit can generate electricity by sliding friction, and the organic friction unit comprises a first organic friction layer and a second organic friction layer, and wherein, the first organic friction layer and the first conductive electrode are set oppositely and can generate electricity by sliding friction, and the second organic friction layer and the second conductive electrode are set oppositely and can generate electricity by sliding friction.

11. A wearable apparatus, comprising a display unit and the frictional electricity-generating device according to claim 1, wherein the frictional electricity-generating device is connected with the display unit, for supplying electrical energy to the display unit.

12. The wearable apparatus according to claim 11, wherein, the first conductive electrode comprises a base layer and a metal nanowire formed on the surface of the base layer.

13. The wearable apparatus according to claim 11, wherein, the second conductive electrode and the organic friction unit can generate electricity by sliding friction, and the organic friction unit comprises a first organic friction layer and a second organic friction layer, and wherein, the first organic friction layer and the first conductive electrode are set oppositely and can generate electricity by sliding friction, and the second organic friction layer and the second conductive electrode are set oppositely and can generate electricity by sliding friction.

14. A method for manufacturing frictional electricity-generating device which comprises at least one friction unit, the method comprising a step of forming a friction unit, wherein the friction unit comprises a first conductive electrode, a second conductive electrode, and an organic friction unit disposed between the first conductive electrode and the second conductive electrode, and wherein the first conductive electrode and the organic friction unit can generate electricity by sliding friction between the first conductive electrode and the organic friction unit which are in contact with each other, the first conductive electrode comprises a friction layer with a concave-convex friction surface, and the friction layer comprises a base layer and a metal nanowire.

15. The frictional electricity-generating device according to claim 4, wherein, the frictional electricity-generating device also includes: two weighting layers, which are fixedly connected with the first organic friction layer and the second organic friction layer respectively; and a driving unit, which is connected with the two weighting layers, for driving the two weighting layers to move back and forth so as to respectively bring the first organic friction layer and the second organic friction layer to move back and forth respectively relative to the first conductive electrode and the second conductive electrode.

16. The electronic apparatus according to claim 10, wherein, the frictional electricity-generating device also includes: two weighting layers, which are fixedly connected with the first organic friction layer and the second organic friction layer respectively; and a driving unit, which is connected with the two weighting layers, for driving the two weighting layers to move back and forth so as to respectively bring the first organic friction layer and the second organic friction layer to move back and forth respectively relative to the first conductive electrode and the second conductive electrode.

17. The wearable apparatus according to claim 13, wherein, the frictional electricity-generating device also includes: two weighting layers, which are fixedly connected with the first organic friction layer and the second organic friction layer respectively; and a driving unit, which is connected with the two weighting layers, for driving the two weighting layers to move back and forth so as to respectively bring the first organic friction layer and the second organic friction layer to move back and forth respectively relative to the first conductive electrode and the second conductive electrode.

18. The method according to claim 14, wherein, the second conductive electrode and the organic friction unit can generate electricity by sliding friction, and the organic friction unit comprises: a first organic friction layer and a second organic friction layer, wherein, the first organic friction layer and the first conductive electrode are set oppositely and can generate electricity by sliding friction, and the second organic friction layer and the second conductive electrode are set oppositely and can generate electricity by sliding friction.

19. The method according to claim 18, wherein, the frictional electricity-generating device also includes: two weighting layers, which are fixedly connected with the first organic friction layer and the second organic friction layer respectively; and a driving unit, which is connected with the two weighting layers, for driving the two weighting layers to move back and forth so as to respectively bring the first organic friction layer and the second organic friction layer to move back and forth respectively relative to the first conductive electrode and the second conductive electrode.

* * * * *